United States Patent

[11] 3,598,201

| [72] | Inventor | James A. Thurmond<br>1305 Honeywood Drive, Crestwood, Mo. 63126 |
|---|---|---|
| [21] | Appl. No. | 826,423 |
| [22] | Filed | May 21, 1969 |
| [45] | Patented | Aug. 10, 1971 |

[54] CLIMBING DEVICE
2 Claims, 5 Drawing Figs.

[52] U.S. Cl. .................................................. 182/92, 182/187
[51] Int. Cl. .................................................. E06c 7/08
[50] Field of Search .......................................... 182/92, 91, 187

[56] References Cited
UNITED STATES PATENTS

| 2,394,203 | 2/1946 | Pruder ........................ | 182/187 |
| 3,368,725 | 2/1968 | Martin ........................ | 182/187 |
| 3,392,802 | 7/1968 | Moore ........................ | 182/187 |

Primary Examiner—Reinaldo P. Machado
Attorney—Kingsland, Rogers, Ezell, Eilers & Robbins ABSTRACT: An L-shaped step is releasably securable to a tree, by a flexible band, to facilitate the climbing of that tree.

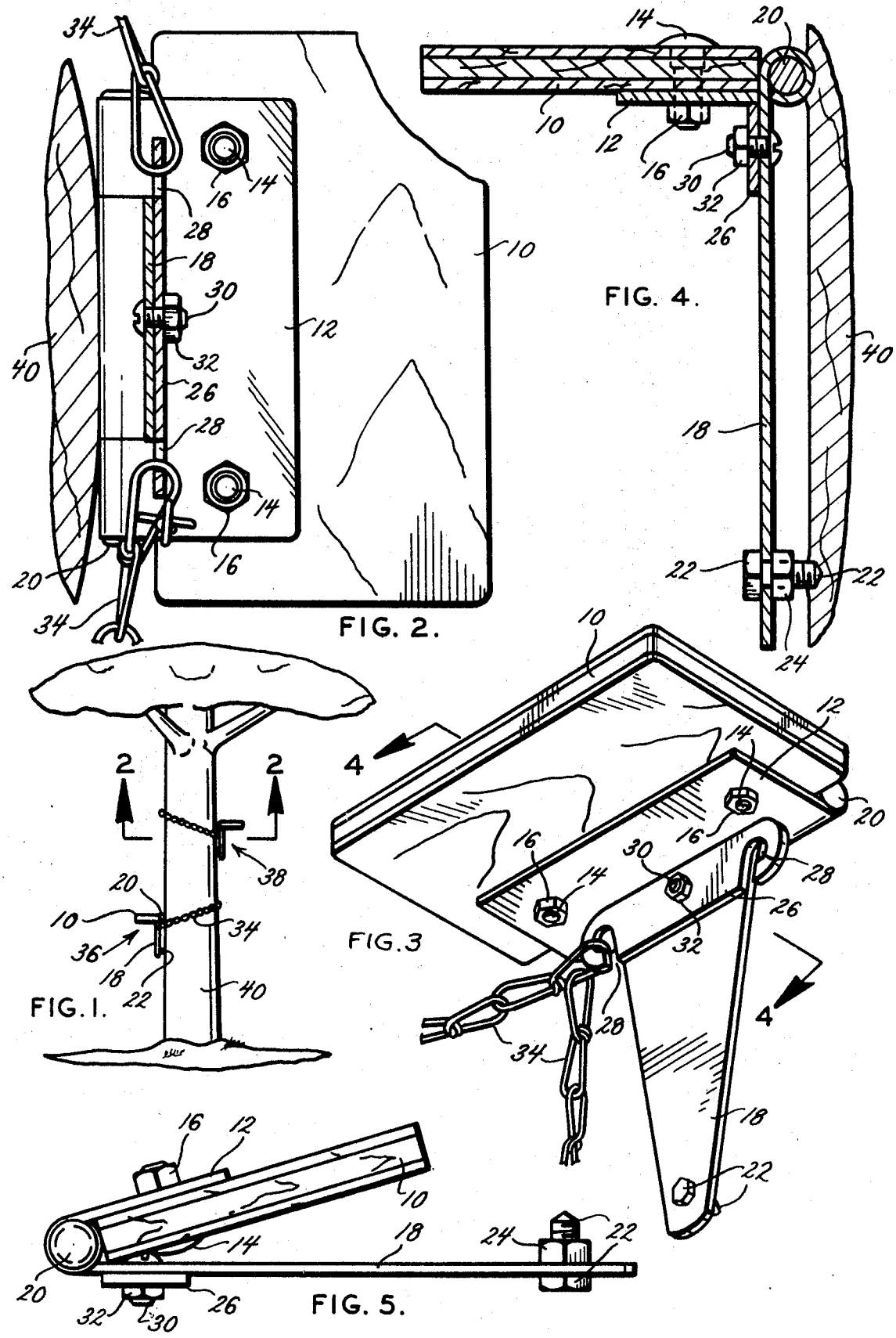

CLIMBING DEVICE

This invention relates to improvements in climbing devices. More particularly, this invention relates to improvements in devices that are releasably securable to a tree to enable a person to climb that tree.

It is, therefore, an object of the present invention to provide a device that is releasably securable to a tree to enable a person to climb that tree.

Hunters frequently find it desirable to climb trees when they are hunting relatively large animals. By climbing a tree, a hunter can minimize the risk of being struck by a bullet fired by another hunter, he can minimize the risk of being seen by his intended quarry, and he can minimize the risk of being smelled by his intended quarry. Unfortunately, however, a tree that is large enough to provide adequate support for a hunter and that is small enough to be climbed without the aid of climbing devices is not always in the area where the hunter wishes to hunt; and hence it would be desirable to provide a tree-climbing device which would enable a hunter to climb a tree. The present invention provides such a device; and it does so by providing a small, readily portable step which is releasably securable to a tree, and which can be used by a hunter in climbing that tree. It is, therefore, an object of the present invention to provide a small, readily portable step which is releasably securable to a tree, and which can be used by a hunter in climbing that tree.

The step provided by the present invention is L-shaped in configuration; and it has a vertically directed tree-engaging portion and a horizontally directed foot-receiving portion. A flexible band, such as a length of chain, can releasably secure the tree-engaging portion of the step to the trunk of a tree; and the foot-receiving portion of that step will then project outwardly from that trunk to receive and support the foot of a hunter. The flexible band will be large enough to encircle tree trunks of different diameters; and hence the step can be secured to, and can help a hunter climb, trees of different sizes. It is, therefore, an object of the present invention to provide a step that is L-shaped in configuration, that has a vertically directed tree-engaging portion and a horizontally directed foot-receiving portion, and that is releasably securable to a tree trunk by a flexible band.

The step provided by the present invention is preferably made so it can be folded into a compact space, but can be readily unfolded to provide the required vertically directed tree-engaging portion and the required horizontally directed foot-receiving portion. Specifically, the step provided by the present invention is preferably made as a hinge, so it can be folded until the tree-engaging portion and the foot-receiving portion thereof are generally parallel, or can be unfolded until that tree-engaging portion and that foot-receiving portion are at right angles to each other. It is, therefore, an object of the present invention to provide a step which is made as a hinge so the tree-engaging portion and the foot-receiving portion thereof can be selectively rotated into generally parallel relation with each other or rotated into position at right angles to each other.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing, FIG. 1 is a broken, elevational view of a tree and of two steps which have been releasably secured to the trunk of that tree, FIG. 2 is a broken, sectional view, on a larger scale, of one of the steps shown in FIG. 1, and it is taken along the plane indicated by the line 2—2 in FIG. 1, FIG. 3 is a perspective view, on a scale intermediate those of FIGS. 1 and 2, of the step shown in FIG. 2, FIG. 4 is a sectional view, on the scale of FIG. 2, through the step shown in FIG. 2, and it is taken along the plane indicated by the line 4—4 of FIG. 3, and FIG. 5 is an elevational view, on the scale of FIG. 2, which shows the step of FIG. 2 in folded condition.

Referring to the drawing in detail, the numeral 10 denotes a plate or platform which is preferably made of a sturdy but lightweight material such as plywood. In one preferred embodiment of the present invention, that plate is 5 inches long, 3 inches wide, and three-eighths of an inch thick. The numeral 12 denotes the T-shaped hinge plate of a T-hinge; and bolts 14 and nuts 16 secure the plate 10 to that hinge plate. The numeral 18 denotes the other hinge plate of the T-hinge; and that hinge plate is pivotally secured to the hinge plate 12 by an elongated hinge pin 20. In the said one preferred embodiment of the present invention, the hinge plate 12 is 4 inches wide and the hinge plate 18 is about 5 inches long.

The numeral 22 denotes a bolt which has a sharp end; and that bolt extends through an opening adjacent the free end of the hinge plate 18 and is held in position within that opening by a nut 24. The numeral 16 denotes an abutment which has generally L-shaped slots 28 therein adjacent the opposite ends thereof. That abutment is secured to the hinge plate 18 by a machine screw 30 and a nut 32. Specifically, the machine screw 30 passes through aligned openings in the hinge plate 18 and in the abutment 26, and the nut 32 is threaded onto the shank of that machine screw to hold that abutment and that hinge plate in assembled relation. The abutment 26 can be moved into engagement with the undersurface of the hinge plate 12; and, whenever that abutment is so moved, that abutment will hold the hinge plate 18 about 90° away from the hinge plate 12. However, the abutment 26 can be moved away from the undersurface of the hinge plate 12, as shown particularly by FIG. 5; and, when that abutment is so moved, it will permit the plate 10 to be moved close to the hinge plate 18.

The numeral 34 denotes a chain which is dimensioned so any one of the links thereof can be disposed within and held by either of the L-shaped slots 28 in the abutment 26. The chain 34 will preferably be long enough to extend around the trunks of even large trees; and that chain can then be used with trees that have smaller trunks by causing one of the intermediate links in that chain to engage one of the L-shaped slots 28 in the abutment 26. The chain 34 will preferably be light in weight; but it must be strong enough to withstand the substantial forces to which it will be subjected in use.

The plate 10, the hinge plates 12 and 18, the hinge pin 20, the bolts and nuts 14 and 16, the bolt and nut 22 and 24, the abutment 26, the screw and nut 30 and 32, and the chain 34 constitute a small, readily portable step 36 which can be used in climbing a tree. As indicated particularly by FIG. 1, that step is disposed adjacent the trunk 40 of a tree so the hinge plate 18 is generally vertically directed and so the plate 12 is generally horizontally directed. Furthermore, that step is disposed adjacent the trunk of that tree so the plate 10 is adjacent the upper end of the generally vertically directed hinge plate 18. In disposing the step 36 engagement with the trunk 40 of the tree, the user will hook the link at one end of the chain 34 in one of the L-shaped slots 28 in the abutment 26, will dispose the hinge plate 18 in engagement with the trunk 40 so the hinge pin 20 is at the top of that hinge plate and so the bolt 22 is at the bottom of that hinge plate, and then will pass the rest of that chain around the trunk of the tree and hook a further link in that chain in the other L-shaped slot 28. If the trunk 40 is large in diameter, the link which is hooked into the other L-shaped slot 28 in the abutment 26 will be close to or at the other end of the chain 34; but if the trunk 40 is small in diameter, the link which is hooked into the other L-shaped slot 28 in the abutment 26 will be an intermediate link in that chain. In either event, the chain 34 will coact with the abutment 26 to completely gird the trunk 40 of the tree; and that chain will be disposed so there is no appreciable amount of slack in it.

The plate 10 can be disposed in the position shown by FIG. 1 while the step 36 is being disposed in engagement with the trunk 40 of the tree, or it can be disposed in a raised position. In a raised position, the plate 10 will be spaced above the level of the abutment 26, and thus will make it easier for the user to hook the chain to the other of the L-shaped slots 28 in that abutment. However, once the chain 34 has been hooked into both of the L-shaped slots 28 in the abutment 26, the plate 10 will be moved into the generally horizontally directed position shown by FIG. 1. At such time, the pointed end of the bolt 22 will be in engagement with the trunk 40 of the tree; and the application of a moderate downwardly directed force to the plate 10 will enable that plate and the hinge plate 12 to act through the hinge pin 20 and the abutment 26 to apply forces to the hinge plate 18 which will cause the pointed end of the bolt 22 to start to penetrate the trunk 40 of the tree. The chain 34 will provide a cinching action, and will thereby prevent unlimited downward movement of the plate 10 relative to the trunk 40; and that chain also will tend to hold both ends of the abutment 26 at the same level. The sharp end of the bolt 22 will penetrate the trunk 40 of the tree, and thus will provide additional resistance to downward movement of the plate 10. In addition, the sharp end of the bolt 22 will help resist any shifting of the step 36 relative to the trunk 40.

The numeral 38 denotes a small, readily portable step that can be identical to the small, readily portable step 36. As shown particularly by FIG. 1, the step 38 is secured to the trunk 40 about the level of the step 36. Also as shown by FIG. 1, the step 38 is displaced circumferentially from the step 36, so the user can rest one foot on the step 36 while resting the other foot on the step 38. The steps 36 and 38 would be displaced 180° apart, as shown by FIG. 1, only where the tree has a small diameter trunk; and, where the steps 36 and 38 were used on a tree having a larger diameter trunk, the steps 36 and 38 would be disposed closer to each other. Furthermore, where a larger tree was to be climbed, more than two steps would be used. Except with persons who have unusually long legs, the lowermost step will be disposed about 18 inches to 2 feet above the ground, and each next higher step will be spaced approximately 18 inches to 2 feet above the next lower step.

The user of the steps 36 and 38, and of additional similar steps, will usually secure at least two, and possibly three, of the steps to the trunk of the tree while he is standing on the ground. To secure a further step to the trunk of the tree, the user will place one foot on the lowermost step and then use that step to raise himself upwardly far enough to enable him to secure a further step to the trunk of the tree. In securing that further step to the trunk of the tree, the user may hook one end of the chain 34 into one of the L-shaped slots 28 in the abutment 26, may reach one arm part way around that trunk to help securely hold himself in position, may press the hinge plate 18 of that further step against the trunk of the tree and then hold that hinge plate against that trunk with that arm, with his shoulder or with some other part of his body, and may then use his other hand to swing the free end of the chain 34 around that trunk. Thereafter, he will hook a link in that chain into the other generally L-shaped slot 28 in the abutment 26 to enable that chain and that abutment to gird the trunk of that tree. If desired, of course, the user could use a length of chain, a length of rope, or a climbing belt to hold himself adjacent the tree while he was standing on the lowermost step; and, where the user did that, he would have both hands available to secure the further step to the trunk of the tree. However, a length of chain, a length of rope, or a climbing belt will not be needed by most hunters who are agile enough to want to hunt from a position up in a tree.

The user will install enough of the steps to enable him to climb far enough upwardly along the length of the trunk of the tree to reach the lower limbs of the tree. Thereafter, the user can use those steps to climb down to the ground to pick up his gun and other gear before climbing back up into the tree. Moreover, the user can use those steps to climb up or climb down the tree as often as desired.

To remove the steps from the trunk of the tree, the user will use the uppermost steps to enable him to climb down far enough along the trunk of the tree to place his chest at the approximate level of the uppermost step; and then he will free the pointed end of the bolt 22 of that uppermost step from the trunk 40 of the tree, and will raise and twist the hinge plate 18 of that uppermost step until one of the L-shaped notches 28 frees the chain link which it formally held. Thereafter, that uppermost step can be lowered down toward the ground, or can be folded and placed in a large pocket of the user's jacket. The user will then step down onto a lower step; and then he will proceed to free the then uppermost step from the tree.

The step 36 is shown as being made from commercially available parts; and, where that is done, that step can be made without any need of making a heavy investment in tools and dies. If desired, however, the hinge plate 18 could be made with an abutment 26 integral with it, or it could be made with projections which would perform the functions of that abutment. Further, if desired, the lower end of the hinge plate 18 could be pointed, and could be bent inwardly, to perform the function of the bolt 22. Moreover, if desired, the hinge plate 12 could be made as long and as wide as the plate 10, and thus could eliminate the need of that plate.

The steps provided by the present invention could be made in different sizes to accommodate users of different weights. However, one size of step will usually be adequate for most persons who are agile enough to want to hunt from a position up in a tree.

Usually, a set of five or six steps will enable a person to climb far enough upwardly along the length of the trunk of a tree to reach the lower branches of that tree. However, if additional steps are needed, those steps could be readily carried by the user. If desired, a suitable sack or pouch with a shoulder strap could be provided to enable the user of the steps to transport those steps as he walked through the woods.

The steps provided by the present invention will be particularly useful in climbing trees. However, those steps can be used in climbing poles which have appreciable diameters. Consequently, it should be understood that wherever the word "tree" is used herein, it is intended to refer to trees or to poles having appreciable diameters.

Whereas the drawing and accompanying description have shown and described a preferred embodiment of the present invention it should be apparent to those skilled in the art that various changes may be made in the form of the invention without affecting the scope thereof.

What I claim is:

1. A small, readily portable step which can be used with a plurality of similar small, readily portable steps to provide a number of circumferentially displaced steps located at progressively higher levels along the trunk of a tree to assist a person climbing said tree and which comprises:
   a tree-engaging portion that is releasably disposable in engagement with said trunk of said tree and that is generally vertically directed,
   a foot-receiving portion that has one edge thereof immediately adjacent said tree-engaging portion and thus immediately adjacent said trunk of said tree and that has the opposite edge thereof extending outwardly from said tree-engaging portion and thus extending outwardly from said trunk of said tree and that is generally horizontally directed, and
   a flexible band that is releasably disposable around said trunk of said tree to releasably hold said tree-engaging portion immediately adjacent said trunk of said tree and to hold at least a part of said tree-engaging portion in engagement with said trunk of said tree,
   a hinge pin pivotally securing said foot-receiving portion to said tree-engaging portion,
   said hinge pin being immediately adjacent, and providing full support for, said one edge of said foot-receiving portion, said foot-receiving portion being selectively pivotable about said hinge pin toward said tree-engaging portion to dispose said foot-receiving portion in generally parallel relation to said tree-engaging portion and thereby permit said step to occupy a relatively small space, said foot-receiving portion being selectively pivotable about said hinge pin away from said tree-engaging portion to enable said foot-receiving portion to be generally horizontally directed while said tree-engaging portion is generally vertically directed, and abutting surfaces on said foot-receiving portion and on said tree-engaging portion adjacent said hinge pin that coact to limit the extent to which said foot-receiving portion can be pivoted away from said tree-engaging portion.

2. A small, readily portable step which can be used with a plurality of similar small, readily portable steps to provide a number of circumferentially displaced steps located at progressively higher levels along the trunk of a tree to assist a person climbing said tree and which comprises:

a tree-engaging portion that is releasably disposable in engagement with said trunk of said tree and that is generally vertically directed, a foot-receiving portion that has one edge thereof immediately adjacent said tree-engaging portion and thus immediately adjacent said trunk of said tree and that has the opposite edge thereof extending outwardly from said tree-engaging portion and thus extending outwardly from said trunk of said tree and that is generally horizontally directed, and a flexible band that is releasably disposable around said trunk of said tree to releasably hold said tree-engaging portion immediately adjacent said trunk of said tree and to hold at least a part of said tree-engaging portion in engagement with said trunk of said tree, a hinge pin pivotally securing said foot-receiving portion to said tree-engaging portion, said hinge pin being immediately adjacent, and providing full support for, said one edge of said foot-receiving portion, said foot-receiving portion being selectively pivotable about said hinge pin toward said tree-engaging portion to dispose said foot-receiving portion in generally parallel relation to said tree-engaging portion and thereby permit said step to occupy a relatively small space, said foot-receiving portion being selectively pivotable about said hinge pin away from said tree-engaging portion to enable said foot-receiving portion to be generally horizontally directed while said tree-engaging portion is generally vertically directed, and abutting surfaces on said foot-receiving portion and on said tree-engaging adjacent said hinge pin that coact to limit the extent to which said foot-receiving portion can be pivoted away from said tree-engaging portion, said abutting surfaces on said foot-receiving portion and on said tree-engaging portion permitting said foot-receiving portion to rotate approximately 270° about said hinge pin from a position in generally parallel relation with said tree-engaging portion to a position generally at right angles to said tree-engaging portion.